(12) United States Patent
Kosmicki et al.

(10) Patent No.: US 10,895,265 B2
(45) Date of Patent: Jan. 19, 2021

(54) SEALING ARRANGEMENT FOR ADJUSTABLE ELEMENTS OF A PUMP

(71) Applicant: Weir Slurry Group, Inc., Madison, WI (US)

(72) Inventors: Randy J Kosmicki, Edgerton, WI (US); Aaron Wirth, Madison, WI (US); Allen David Russell, Redcliffe (AU)

(73) Assignee: Weir Slurry Group, Inc., Madison, WI (US)

( * ) Notice: Subject to any disclaimer, the term of this patent is extended or adjusted under 35 U.S.C. 154(b) by 45 days.

(21) Appl. No.: 16/086,116

(22) PCT Filed: Mar. 10, 2017

(86) PCT No.: PCT/US2017/021760
§ 371 (c)(1),
(2) Date: Sep. 18, 2018

(87) PCT Pub. No.: WO2017/160624
PCT Pub. Date: Sep. 21, 2017

(65) Prior Publication Data
US 2020/0063747 A1 Feb. 27, 2020

Related U.S. Application Data

(60) Provisional application No. 62/310,094, filed on Mar. 18, 2016.

(51) Int. Cl.
*F04D 29/08* (2006.01)
*F04D 29/42* (2006.01)
(Continued)

(52) U.S. Cl.
CPC ....... *F04D 29/086* (2013.01); *F04D 29/4293* (2013.01); *B29L 2031/7496* (2013.01);
(Continued)

(58) Field of Classification Search
CPC .... F04D 29/086; F04D 29/4293; F04D 29/22; F04D 29/62; F04D 29/622; F04D 29/628;
(Continued)

(56) References Cited

U.S. PATENT DOCUMENTS 1,735,754 A * 11/1929 Hargis ................. F04D 29/167
415/128
2,232,548 A 2/1941 McAnerney
(Continued)

FOREIGN PATENT DOCUMENTS

| CN | 2151289 Y | 12/1993 |
|---|---|---|
| CN | 2190191 Y | 2/1995 |
| CN | 201125884 Y | 10/2008 |

*Primary Examiner* — David E Sosnowski
*Assistant Examiner* — Wayne A Lambert
(74) *Attorney, Agent, or Firm* — Morriss O'Bryant Compagni Cannon, PLLC.

(57) ABSTRACT

A seal, for use with pump casing elements that are adjustable relative to each other, includes an annular band and a resilient annular flange oriented at a non-perpendicular angle to a first surface of the annular band such that the seal, in use, is able to provide greater adjustment between the adjustable pump elements while maintaining a reliable seal between the pump elements.

23 Claims, 5 Drawing Sheets

(51) Int. Cl.
*B29L 31/00* (2006.01)
*F04D 29/22* (2006.01)
*F04D 29/62* (2006.01)
*F16J 15/02* (2006.01)

(52) U.S. Cl.
CPC ............ *F04D 29/22* (2013.01); *F04D 29/622* (2013.01); *F16J 15/022* (2013.01)

(58) Field of Classification Search
CPC ...... F04D 29/426; F04D 29/2294; F04D 7/04; B29L 2031/7496; F16J 15/022; F16J 15/025; F16J 15/064; F16J 15/32
USPC .......................................................... 416/205
See application file for complete search history.

(56) References Cited

U.S. PATENT DOCUMENTS

| | | | | |
|---|---|---|---|---|
| 2,608,425 A * | 8/1952 | Krug | ................. | F16J 15/36 277/384 |
| 2,865,300 A | 12/1958 | Garris | | |
| 3,094,075 A * | 6/1963 | Logue | ................. | F04D 29/106 415/131 |
| 3,114,568 A * | 12/1963 | Buono | ................. | F16L 51/00 285/235 |
| 3,490,343 A * | 1/1970 | Afanador | ................. | F16J 15/52 92/168 |
| 3,754,834 A * | 8/1973 | Wolters | ................. | F04D 29/167 415/110 |
| 4,270,442 A * | 6/1981 | Bainard | ................. | F16D 65/18 188/72.4 |
| 4,327,925 A * | 5/1982 | Alexander | ................. | B23P 15/00 188/73.31 |
| 4,524,677 A * | 6/1985 | Ashman | ................. | F16D 65/18 188/72.4 |
| 4,666,166 A * | 5/1987 | Hart | ................. | F04B 43/0054 137/510 |
| 4,690,414 A | 9/1987 | Haaland | | |
| 4,703,939 A * | 11/1987 | Wentworth | ................. | F04D 29/126 277/372 |
| 5,048,648 A * | 9/1991 | Le Deit | ................. | F16J 3/042 188/370 |
| 5,346,662 A * | 9/1994 | Black | ................. | B29C 70/84 264/138 |
| 5,458,344 A * | 10/1995 | Weiler | ................. | F16J 65/18 277/634 |
| 5,605,338 A | 2/1997 | Poll | | |
| 5,772,217 A * | 6/1998 | Poll | ................. | F16J 15/36 277/383 |
| 5,921,748 A * | 7/1999 | Frater | ................. | F04D 29/167 415/172.1 |
| 5,971,704 A * | 10/1999 | Blattmann | ................. | F04D 29/622 415/173.2 |
| 7,905,336 B2 * | 3/2011 | Cortinovis | ................. | F16J 3/043 188/370 |
| 8,991,565 B2 * | 3/2015 | Champion | ................. | F16D 65/005 188/72.4 |
| 9,739,285 B2 * | 8/2017 | Kosmicki | ................. | F04D 29/4286 |
| 2005/0191175 A1 | 9/2005 | Geldenhuys | | |
| 2009/0180866 A1 | 7/2009 | Bourgeois | | |
| 2014/0271177 A1 | 9/2014 | Kosmicki et al. | | |
| 2015/0192206 A1 | 7/2015 | Wagner | | |

\* cited by examiner

SEALING ARRANGEMENT FOR ADJUSTABLE ELEMENTS OF A PUMP

TECHNICAL FIELD

This disclosure relates in general to seal arrangements in centrifugal pumps and, in particular, to an improved sealing arrangement for sealing a movable throatbush with respect to other pump casing elements of a centrifugal pump.

BACKGROUND OF THE DISCLOSURE

The configuration and structure of centrifugal pumps vary widely. The configuration of centrifugal pumps that are principally, but not exclusively, relevant to this disclosure are those that have an outer casing which generally forms a pump chamber in which an impeller is positioned for rotation. Such pumps have a drive mechanism, namely a drive shaft, that enters a drive side of the pump casing for connection to the impeller. Often, opposing the drive side of the pump is a suction side that provides an inlet for fluid to enter into the pump casing for processing by the impeller. The pump casing also has a discharge outlet for providing egress of fluid from the pump casing.

In certain types of pumps that are particularly relevant to this disclosure, a throatbush is provided on the suction side of the pump, which provides an inlet for directing fluid to the eye of the impeller. The throatbush has an inwardly oriented surface that is positioned adjacent to the suction side of the impeller, and a gap of very small tolerance is provided therebetween. In the pumping of fluids, especially slurries, which contain particulate matter, the fluid infiltrates into the gap between the throatbush and the impeller and eventually causes wear on the throatbush and/or impeller. Consequently, pump performance is compromised as the gap between the throatbush and impeller increases due to wear. It is desirable, therefore, to lessen that gap by axially adjusting the throatbush to bring the inwardly oriented surface of the throatbush closer to the impeller. The throatbush is, therefore, configured to be axially-movable relative to the other pump casing elements to effect the adjustment.

It is necessary in these arrangements to provide a sealing mechanism between the throatbush and the other pump casing elements to assure that fluid, or slurry, does not infiltrate into and between the pump casing elements and the throatbush. The sealing mechanism must be designed to provide a comprehensive and continuous sealing of the throatbush from the other pump elements throughout the axial adjustment of the throatbush.

One example of a sealing mechanism for this purpose is disclosed in U.S. Pat. No. 5,941,536 to Hill, in which a bellows-like seal is provided on the side of the throatbush that faces away from the impeller. A bellows-like flange is clamped between a main liner and a side liner plate of the pump casing. As a threaded bolt, positioned through the side liner plate, is rotated, axial movement of the throatbush is achieved, and the bellows-like flange allows the throatbush to move while maintaining a seal between the throatbush and the pump casing elements.

Another form of a conventional sealing mechanism for a throatbush is shown herein in FIGS. 1-5. In the illustrated configuration, a sealing mechanism is provided with a resilient arm, which is positioned between and clamped by a main liner and a side liner plate. As will be described more fully below, and is clearly seen in FIG. 5, the distance at which the throatbush is able to move axially away from the side liner plate is limited by the configuration of the resilient arm and the sealing mechanism. Surety of the seal can be compromised if the throatbush is adjusted too far. The same limitation attends with the bellows-like arrangement disclosed in the sealing mechanism of the '536 patent. Both known sealing arrangements provide a reliable seal, but are limited in the amount of axial distance that the throatbush can be adjusted relative to the pump casing elements, namely the side liner plate and the main liner.

SUMMARY

In a first aspect of the disclosure, embodiments are disclosed of a seal for use with pump casing elements that are adjustable relative to each other, the seal comprising an annular band having a first circumferential end and a second circumferential end, and having a first surface extending at least partially between said first circumferential end and said second circumferential end, and having a second surface extending at least partially between said first circumferential end and said second circumferential end, said second surface being spaced from said first surface and oriented in a direction opposite to said first surface, and having a resilient annular flange positioned proximate said second circumferential end of said annular band and extending at a non-perpendicular angle with respect to said first surface. The seal of the disclosure provides a resilient annular flange that is configured and positioned to provide greater axial adjustment between pump elements while maintaining a reliable seal between the pump casing elements.

In certain embodiments, the seal further comprises a pivotable region located between the resilient annular flange and the annular band to facilitate movement of said resilient annular flange toward and away from said first surface of said annular band, said pivotable region being located beyond a plane defined by said first surface of said annular band, in a direction away from said second surface.

In some embodiments, the resilient annular flange is further comprised of a terminal edge positioned at a distance from said pivotable region.

In certain of those embodiments, the seal further comprises a locating rim extending along and outwardly from said terminal edge of said resilient annular flange.

In other embodiments, the resilient annular flange further comprises a skirt portion that is connected at one end to said annular band, and a collar portion that is connected to said skirt portion and which extends away from said skirt portion in a direction away from said annular band.

In yet other embodiments, the collar portion comprises a terminal edge and said terminal edge comprises a locating rim.

In some embodiments, the annular band is made of resilient annular material.

In certain embodiments, the annular band and resilient annular flange are unitarily formed.

In other certain embodiments, the first surface of said annular band comprises surface protrusions.

In yet other embodiments, the seal further comprises an inwardly extending annular lip projecting outwardly in a direction away from said second surface.

In still other embodiments, the annular lip is located proximate said second circumferential end of said annular band.

In a second aspect, a throatbush device, for use in a centrifugal pump having a volute portion and a side liner portion that defines a suction side plate of a centrifugal pump, comprises a throatbush having an axially-extending tubular portion and a radially-extending ring portion, the radially-extending ring portion having an outer circumferential area with an annular surface, a seal located along the annular surface of the outer circumferential area of said throatbush, the seal comprising an annular band having a first circumferential end and a second circumferential end, a first surface extending at least partially between said first circumferential end and said second circumferential end, a second surface extending at least partially between said first circumferential end and said second circumferential end, the second surface being positioned along said annular surface of the throatbush, and a resilient annular flange positioned proximate said second circumferential end of said annular band, said resilient annular flange having a pivotable region that extends from said first surface of said annular band beyond a plane, defined by said first surface of said annular band, in a direction radially away from said second surface of said annular band. The throatbush device of the disclosure is provided with a seal arrangement that enables greater axial adjustment of the throatbush relative to structural elements of a centrifugal pump while maintaining a reliable seal.

In some embodiments, the resilient annular flange is structured to provide a first face and a second face, the second face being positioned at an angle to said first face, both said first face and said second face being oriented for contact with a suction plate portion of a centrifugal pump.

In yet other embodiments, the resilient annular flange is further structured with a third face, co-extensive in part with said second face of said resilient annular flange, and being oriented for location against a pump element portion of a centrifugal pump, the second face and third face defining a thickness therebetween that is structured for securement between a pump element portion and suction plate portion of a centrifugal pump.

In other embodiments, the resilient annular flange is further structured with a fourth face that is co-extensive with said first face, the fourth face, in use, being positioned to move along said first surface of said annular band.

In still other embodiments, the resilient annular flange further comprises a locating rim that extends outwardly from said third face to engage with a pump element portion of a centrifugal pump.

In yet other embodiments, the locating rim is positioned proximate a terminal edge of said resilient annular flange.

In certain embodiments, the first surface of said annular band is configured with surface protrusions.

In other certain embodiments, the seal further comprises an annular lip that projects from said second surface and is positioned to engage an annular groove formed in the ring portion of the throatbush near the outer circumferential area thereof.

In a third aspect, a centrifugal pump comprises an outer pump casing defining a volute, a main liner positioned along an inner surface of the volute of the outer pump casing, a suction plate connected to said outer casing and positioned adjacent a portion of the main liner, the suction plate having a central opening defining a suction inlet opening, an axially-movable throatbush having an axially-extending tubular portion, that extends through the suction inlet opening of the suction plate, and a radially-extending ring portion that is positioned adjacent the suction plate, the radially-extending ring portion having an outer circumferential area with an annular surface, a seal located along the annular surface of the outer circumferential area of said throatbush, the seal comprising an annular band having a first circumferential end and a second circumferential end, a first surface extending at least partially between said first circumferential end and said second circumferential end, a second surface extending at least partially between said first circumferential end and said second circumferential end, the second surface being positioned along said annular surface of the throatbush, and a resilient annular flange positioned proximate said second circumferential end of said annular band, said resilient annular flange having a pivotable region that extends from said first surface of said annular band beyond a plane, defined by said first surface of said annular band, in a direction radially away from said second surface of said annular band, and wherein the resilient annular flange of the seal is positioned, along two extending faces of the resilient annular flange, against the suction plate, and wherein the resilient annular flange is clamped between the suction plate and the main liner so that the resilient annular flange, at initial assembly of the centrifugal pump, is positioned against said first surface of said annular band of said seal. The centrifugal pump of this aspect provides improved pump performance due to the ability to provide greater axial adjustment of the throatbush relative to other pump elements while maintaining a reliable seal between the throatbush and the pump elements.

In certain embodiments, the seal further comprises an annular lip that projects from said second surface of said annular band and is positioned to engage an annular groove formed in the ring portion of the throatbush near the outer circumferential area thereof.

In yet other embodiments, the resilient annular flange further comprises a locating rim that is positioned to engage with the main liner of the centrifugal pump.

In a fourth aspect, a method of sealing an adjustable throatbush of a centrifugal pump relative to other pump elements of the centrifugal pump comprises providing a centrifugal pump having an outer casing, a main liner positioned along a volute of the outer casing and a suction plate having a central inlet opening; providing an axially-movable throatbush having an axially-extending tubular portion, that extends through the central inlet opening of the suction plate of the pump, and a radially-extending ring portion that is positioned adjacent the suction plate, the radially-extending ring portion having an outer circumferential area with an annular surface; providing a seal located along the annular surface of the outer circumferential area of the throatbush, the seal comprising an annular band having a first circumferential end and a second circumferential end, a first surface extending at least partially between said first circumferential end and said second circumferential end, a second surface extending at least partially between said first circumferential end and said second circumferential end, the second surface being positioned along said annular surface of the throatbush, and a resilient annular flange positioned proximate said second circumferential end of said annular band, said resilient annular flange having a pivotable region that extends from said first surface of said annular band beyond a plane, defined by said first surface of said annular band, in a direction radially away from said second surface of said annular band; positioning the resilient annular flange of the seal to contact the suction plate of the pump along two extending faces of the resilient annular flange; and clamping a portion of the resilient annular flange between the suction plate and the main liner of the pump such that, at initial assembly of the centrifugal pump, a portion of the resilient annular flange is positioned against the first surface of the annular band of the seal and is configured to move along the first surface of the annular band as the axially-movable throatbush is axially adjusted.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
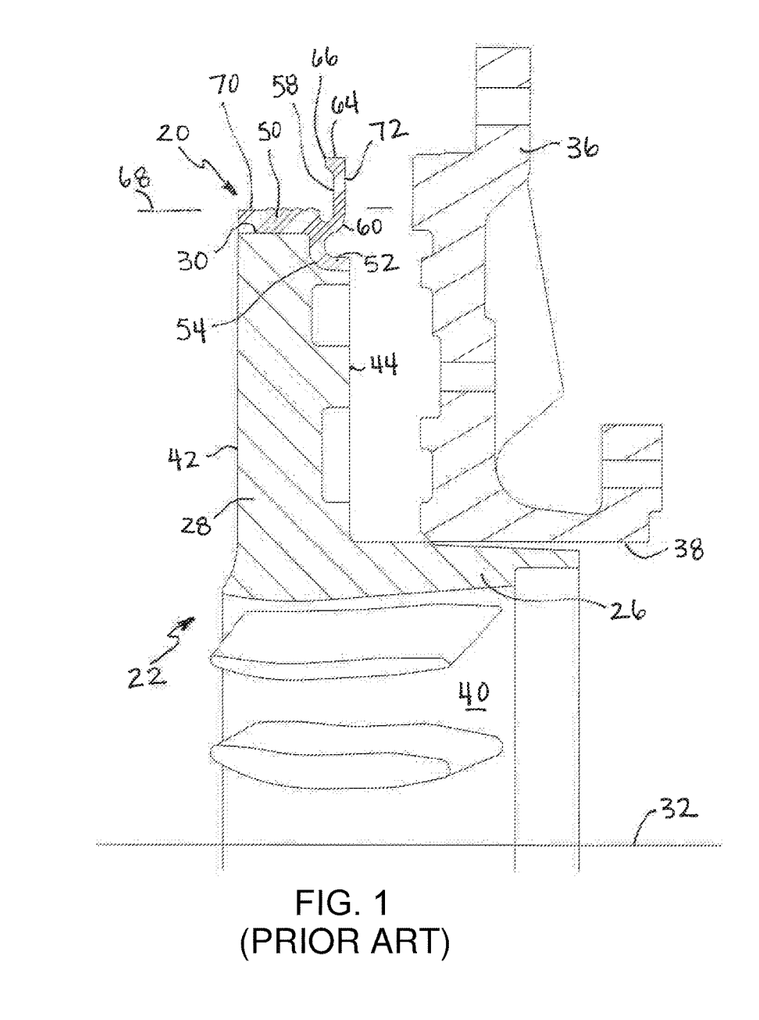
FIG. 1 is a partial view in cross section of a conventional throatbush and seal mechanism arrangement showing the throatbush spaced from a side liner plate.

FIGS. 1-5 illustrate, by way of comparison, a conventional seal mechanism 20 for a movable throatbush 22 of a centrifugal pump. As can be seen in FIG. 1, the throatbush 22 has an axially-extending tubular portion 26 and a radially-extending ring portion 28 with an outer circumferential surface 30 that is radially spaced from the centerline 32 or rotational axis of the pump. The throatbush 22, in use, is positioned adjacent a pump casing element, typically a side liner plate 36, which is positioned on the suction side of the pump. The side liner plate 36 is configured with an inlet opening 38, and the tubular portion 26 of the throatbush 22 is slidably received in the inlet opening 38.

Figure 2:
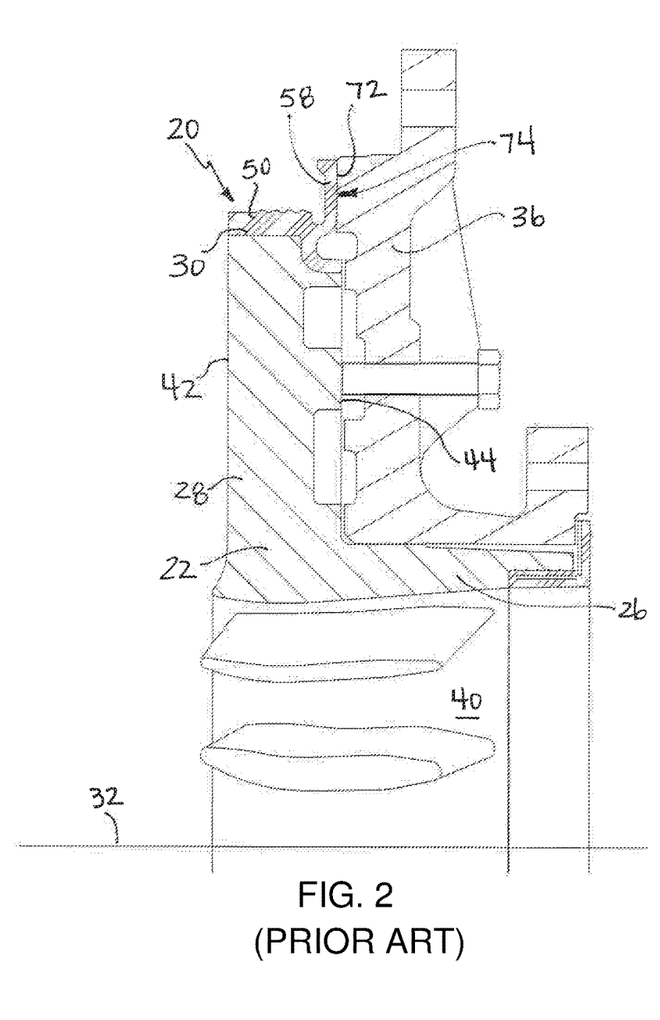
FIG. 2 is a partial view in cross section of the throatbush and seal mechanism arrangement of FIG. 1, showing the throatbush in registration with the side liner plate.

In operation, fluid enters into the pump via a fluid inlet 40 that is provided in the throatbush 22. The ring portion 28 of the throatbush has an inner surface 42 that is oriented toward the impeller (not shown), which is positioned for rotation within the pump casing or pump chamber (not shown). The ring portion 28 also has an opposing outer surface 44 that is oriented toward the pump casing element, or side liner plate 36. FIG. 2 illustrates the throatbush 22 in registration with the side liner plate 36 at initial assembly of the pump.

The seal mechanism 20 of this conventional device comprises an elastomer ring 50 that is adhered to the outer circumferential surface 30 of the throatbush 22. An arcuate lip 52 extends radially inwardly from the elastomer ring 50 and is adhered to an annular shoulder 54 formed along the outer circumferential surface 30 of the ring portion 28. The seal mechanism 20 is further configured with a resilient arm portion 58 that extends from a bend 60, which is formed in proximity to the arcuate lip 52, to a terminal end 64 which is spaced radially from the elastomer ring 50. An axially-extending ridge 66 is formed at the terminal end 64 of the resilient arm 58.

FIG. 1 shows the seal mechanism 20 in its initial state following molding to the throatbush 22. It is to be noted that the resilient arm 58 is molded to extend perpendicularly relative to a plane 68 formed along the outer surface 70 of the ring portion 50. The bend 60 between the ring portion 50 and the resilient arm 58 is located below, or radially inwardly, from the plane 68 formed along the outer surface 70 of the ring portion 50. This configuration of the molded seal mechanism is relevant to its operation during axial adjustment of the throatbush 22, as depicted further in FIGS. 3-5.

FIG. 2 depicts the position of the throatbush 22 and seal mechanism 20 when initially assembled in registration with the side liner plate 36. It can be seen that the resilient arm 58 of the seal mechanism 20 has an outward, radially-extending surface 72 that is positioned against a surface 74 of the side liner plate 36.

Figure 3:
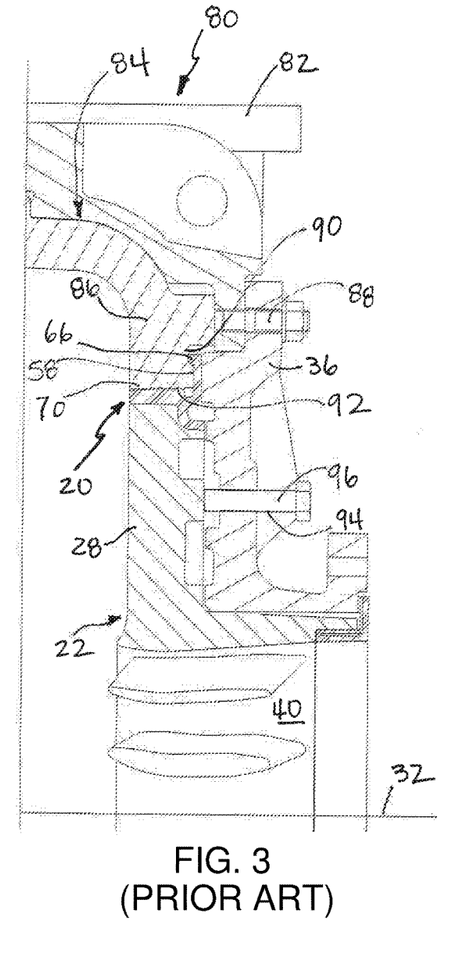
FIG. 3 is a partial view in cross section of the throatbush and seal mechanism of FIG. 1, showing the throatbush positioned in the pump casing at initial assembly.

FIG. 3 depicts more fully the positioning of the throatbush 22 and seal mechanism 20 in a centrifugal pump 80, which generally comprises an outer pump casing 82 defining a volute 84, and a main liner 86 positioned within the volute 84 of the outer pump casing 82. The side liner plate 36 is secured to the outer pump casing 82 by a plurality of bolts 88. In FIG. 3, which depicts the centrifugal pump 80 at initial assembly, the resilient arm 58 is clamped between the side liner plate 36 and the main liner 86. The axially-extending ridge 66 of the resilient arm 58 is positioned against and within an annular channel 90 formed in the main liner 86, and the outer surface 70 of the ring portion 50 of the seal mechanism 20 is in sealing contact with an axially-extending surface 92 of the main liner 86.

Figure 4:
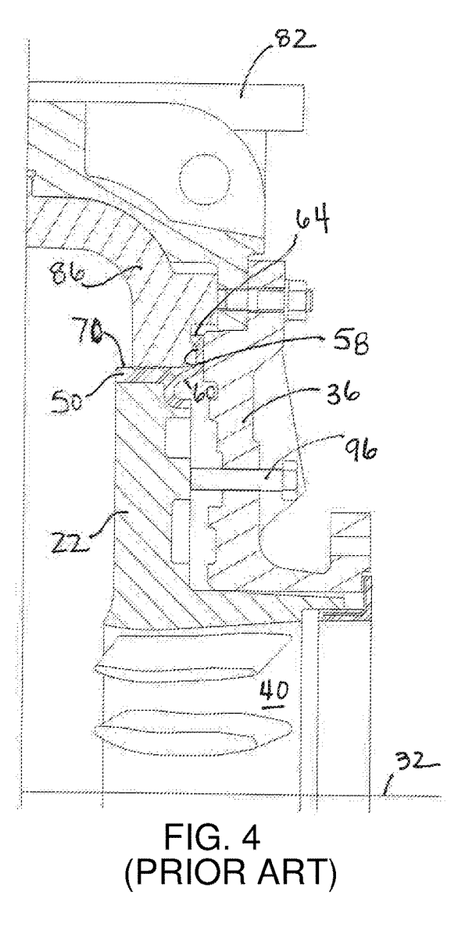
FIG. 4 is a partial view in cross section of the throatbush and seal mechanism of FIG. 3, showing the position of the throatbush relative to the side liner plate as the throatbush is adjusted away from the side liner plate.

The side liner plate 36 is formed with a plurality of openings 94 through which adjusting screws 96 are positioned. The adjusting screws 96 contact the ring portion 28 of the throatbush 22. As the impeller (not shown) and throatbush 22 wear, due to infiltration of fluids and slurries therebetween, the adjusting screws 96 are rotated, which causes the throatbush 22 to move axially away from the side liner plate 36, as shown in FIG. 4.

Figure 5:
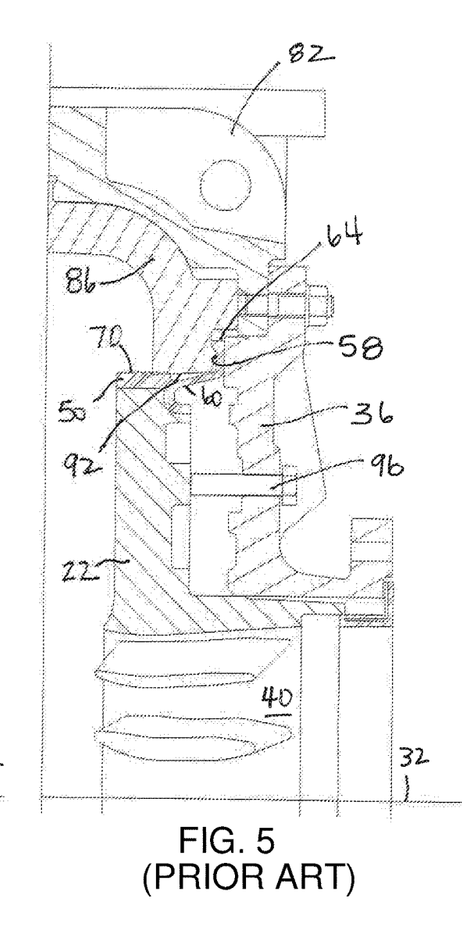
FIG. 5 is a partial view in cross section of the throatbush and seal mechanism of FIGS. 3 and 4, showing the position of the throatbush relative to the pump casing elements as the throatbush is fully adjusted away from the side liner plate.

As the throatbush 22 is axially adjusted away from the side liner plate 36 and toward the impeller (not shown), the outer surface 70 of the seal mechanism 20 slides along the axially-extending surface 92 of the main liner 86. The seal between the throatbush 22 and main liner 86 is maintained by virtue of the clamping of the resilient arm 58 between the main liner 86 and the side liner plate 36. As shown in FIGS. 4 and 5, the resilient arm 58 is allowed to stretch, relative to the ring portion 50 of the seal mechanism, by virtue of the bend 60 that is positioned between the ring portion 50 and the terminal end 64 of the resilient arm 58. It can be seen, however, that axial movement of the throatbush 22 becomes limited as the resilient arm 58 is stretched to a maximum degree of tension, as depicted in FIG. 5.

Figure 6:
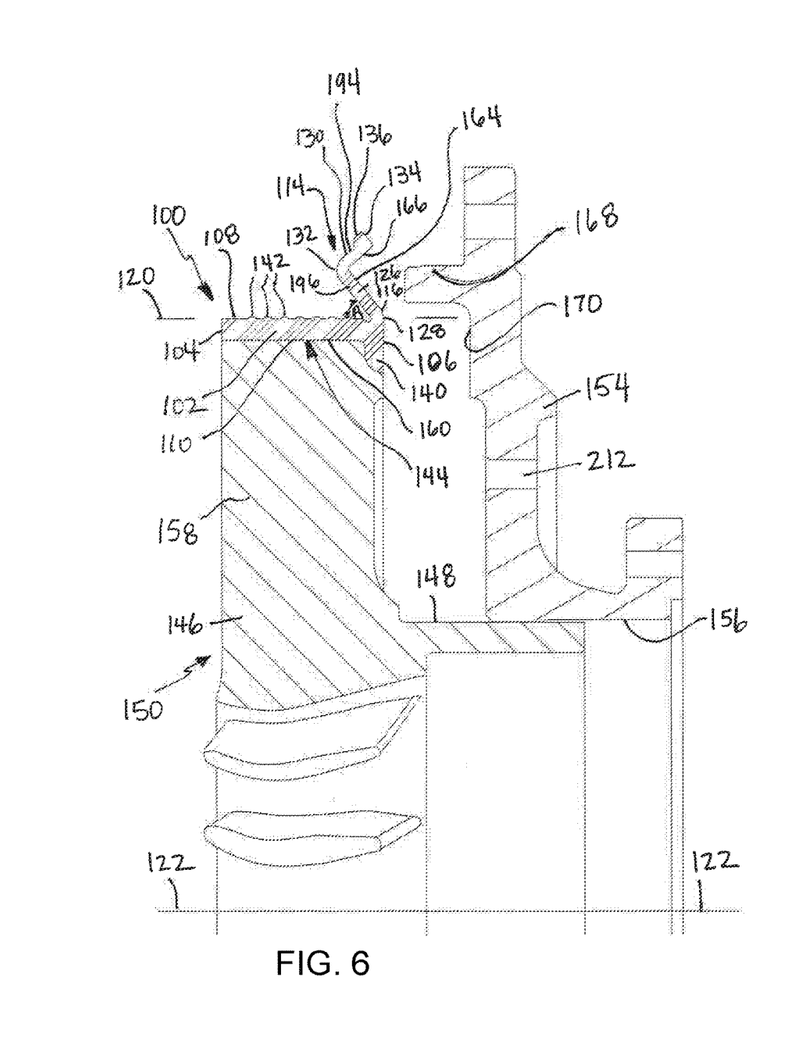
FIG. 6 is a partial view in cross section of a throatbush and seal arrangement in accordance with this disclosure, depicting the seal mechanism in its form as molded to the throatbush prior to installation in a pump.

Having described the conventional seal mechanism for comparison purposes, the present disclosure is now illustrated in FIGS. 6-8E. In accordance with the present disclosure, and as shown in FIG. 6, a seal 100 is provided for use with pump elements that are adjustable relative to each other. The seal 100 comprises an annular band 102 having a first circumferential end 104, which, in use, is oriented toward and in near adjacency to the impeller, and a second circumferential end 106, which is oriented, in use, toward the pump casing part relative to which adjustment is made. A first surface 108 extends fully or at least partially between the first circumferential end 104 and the second circumferential end 106 of the annular band 102. A second surface 110 extends fully or at least partially between the first circumferential end 104 and the second circumferential end 106, the second surface 110 being spaced from the first surface 108 and oriented in a direction opposite to the first surface 108 to provide a thickness T between the first surface 108 and the second surface 110.

A resilient annular flange 114 is positioned proximate the second circumferential end 106 of the annular band 102 and is oriented, at the point of manufacture, at a non-perpendicular angle A to the first surface 108. In other embodiments, the resilient annular flange 114 is oriented at a perpendicular angle to the first surface 108.

A pivotable region 116 is located between the resilient annular flange 114 and the annular band 102 to facilitate movement of the resilient annular flange 114 toward, away from and along the first surface 108 of the annular band 102. The pivotable region 116 is located radially beyond, or radially away from or above, a plane 120, defined by and along the first surface 108 of the annular band 102, in a direction away from the second surface 110. The annular band 102 is oriented, in use, to encircle a centerline 122 or rotational axis, of the pump in which the seal 100 is installed. Thus, the first surface 108 extends in a direction generally aligned with the centerline 122 and is oriented to face away from the centerline 122. The pivotable region 116 is located at a point that is beyond or radially located above or away from the plane 120 of the first surface 108.

The resilient annular flange 114 is further comprised of a skirt portion 126 that is connected at one end 128 to the annular band 102, and a collar portion 130 that is connected to the skirt portion 126. The skirt portion 126 of the resilient annular flange 114 is, at formation, directed at a non-perpendicular angle A to the plane 120 of the first surface 108. The skirt portion 126 is preferably formed as a continuous annular area of resilient material. By being formed, or molded, at an angle A to the annular band 102, the skirt portion 126 is more flexible and ideally positioned to move relative to the first surface 108 of the annular band 102 as described more fully hereafter.

The collar portion 130 extends away from the skirt portion 126 in a direction away from the annular band 102. The collar portion 130 may, in a preferred embodiment, be formed at a generally perpendicular angle to the skirt portion 126, but other angles of degree (e.g., a generally non-perpendicular angle to the skirt portion 126) may be suitable as well. An elbow region 132 is defined at the angular delineation between the collar portion 130 and the skirt portion 126. The collar portion 130 is formed with a terminal edge 134, which is positioned at a distance from the pivotable region 116. A locating rim 136 is formed proximate the terminal edge 134 and projects outwardly from the collar portion 130 in a direction away from the skirt portion 126.

The seal 100 may further include a radially inwardly extending annular lip 140, which projects outwardly in a direction away from the second surface 110 of the annular band 102, and toward the centerline 122. The annular lip 140 is located proximate the second circumferential end 106 of the annular band 102 and is positioned to engage a portion of a throatbush, as will be described further below.

The annular band 102 may preferably be made of resilient material, and may be made of a material that is of the same or a similar resilience or flexure quality as the resilient annular flange 114. The annular band 102 and resilient annular flange 114 are preferably unitarily formed and the annular band 102 is formed to the outer circumferential area 144 of a throatbush 146 in a molding process where the throatbush 146 is placed in a configured mold and resilient material is poured into the mold and allowed to cure in contact with the throatbush 146. Alternatively, the seal 100 may be formed in a mold separate from the throatbush 146 and then may be bonded to the throatbush 146 after having been separately formed from the throatbush 146.

As will be explained more fully hereinafter, the first surface 108 of the annular band 102 may optionally be formed, in the molding process, with one or more surface protrusions 142 that extend outwardly from the first surface 108 to improve the sealing capabilities of the seal 100.

Figure 7:
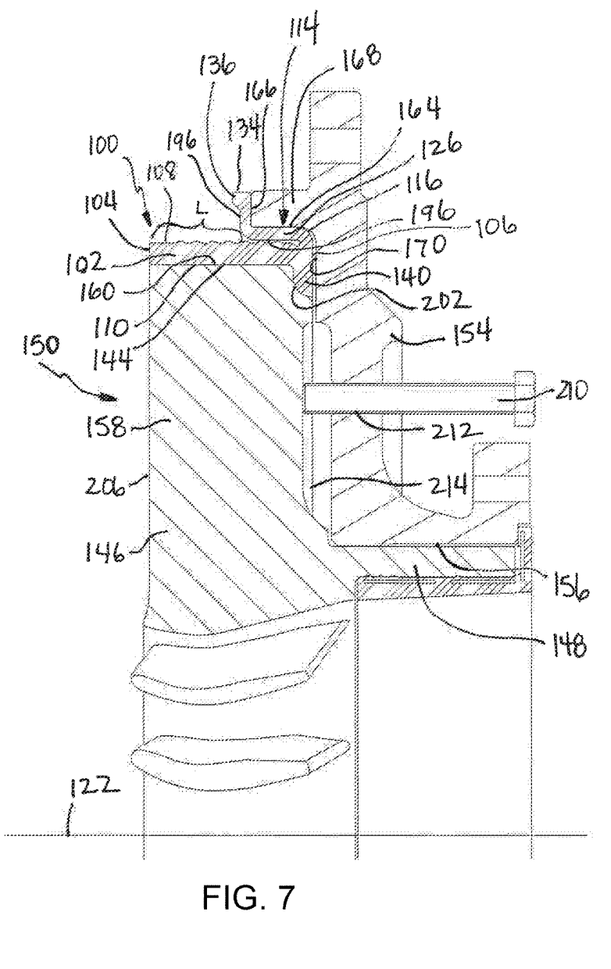
FIG. 7 is a partial view in cross section of the throatbush and seal of FIG. 6 when installed in registration with a suction plate of a pump.

FIG. 6 illustrates the configuration of the seal 100 at the initial point of formation with the throatbush 146 to form a throatbush device 150. FIG. 7 illustrates a throatbush device 150 in accordance with the disclosure, which is suitable for use in a centrifugal pump having pump elements or parts that are adjustable relative to other pump elements or parts. By way of illustration, the adjustable throatbush 146 is adjustable relative to other, stationary pump elements, such as, for example, a suction plate 154, which may also be referred to in the industry as a side liner. The suction plate 154 is formed with an inlet opening 156.

The throatbush device 150 includes a throatbush 146 having an axially-extending tubular portion 148, which is slidably received in the inlet opening 156 of a suction plate 154. The throatbush device 150 also includes a radially-extending ring portion 158 having an outer circumferential area 144 with an annular circumferential surface 160. The seal 100 is located along the annular circumferential surface 160 of the outer circumferential area 144 of the throatbush 146.

FIG. 7 further depicts the throatbush device 150 in a position at initial assembly of a pump, where the throatbush 146 is in registration with the suction plate 154 and the seal 100 is in an initial position relative to the suction plate 154. The resilient annular flange 114 is structured to provide a first face 164, formed along the skirt portion 126, and a second face 166, formed along the collar portion 130, the second face 166 being positioned at an angle to the first face 164. Both the first face 164 and the second face 166 are oriented for contact with an axially-inwardly facing shoulder 168 of the suction plate 154. The second circumferential end 106 of the annular band 102 is positioned to be located adjacent an inner annular surface 170 of the suction plate 154.

Figure 8A:
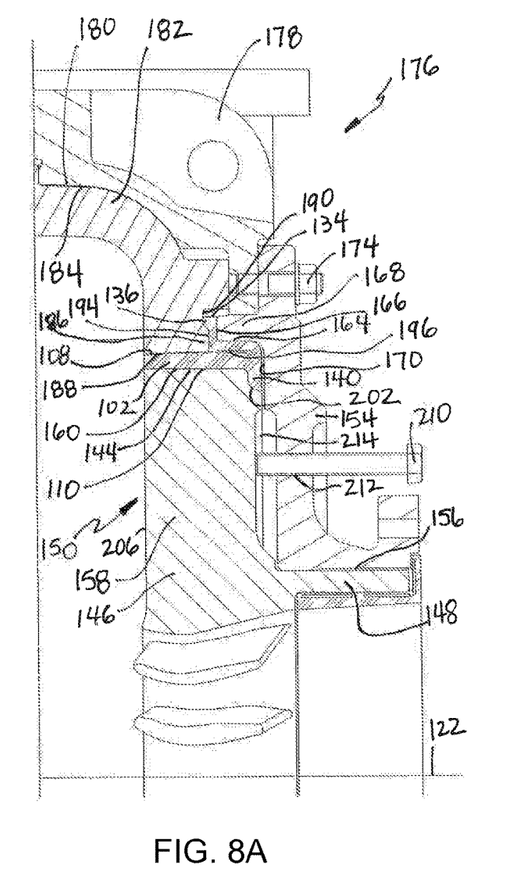
FIG. 8A depicts in a partial view in cross section, a throatbush and seal in accordance with this disclosure when initially installed in a centrifugal pump.

FIG. 8A illustrates in further detail the placement of the throatbush device 150 in a centrifugal pump 176 that includes an outer pump casing 178 defining a volute 180, a main liner 182 positioned along an inner surface 184 of the volute 180 of the outer pump casing 178 and a suction plate 154. The suction plate 154 is secured to the outer pump casing 178 by a plurality of bolts 174. The axially-inwardly facing shoulder 168 of the suction plate 154 is positioned adjacent a portion 186 of the main liner 182.

As previously described, the suction plate 154 has a central opening defining a suction inlet opening 156, and the axially-extending tubular portion 148 of the throatbush 146 is slidably received in the suction inlet opening 156 to extend through the suction inlet opening 156. The radially-extending ring portion 158 of the throatbush 146 is initially positioned, at assembly, adjacent to and in registration with the suction plate 154. The radially-extending ring portion 158, and specifically the annular surface 160 of the outer circumferential area 144 having the seal 100 located along the annular circumferential surface 160, is positioned so that a length L (see FIG. 7) of the first surface 108 of the seal 100 is located in contact with an axially-extending surface 188 of the main liner 182. Not all of the first surface 108 of the annular band 102 is initially in contact with the axially-extending surface 188 of the main liner 182 at the point of assembly. The axially extending surface 188 of the main liner 182, at assembly, is in contact with only a portion of the seal 100 at the axially inward end of the seal 100, i.e., in the direction of the first circumferential end 104.

The collar portion 130 of the resilient annular flange 114 includes the second face 166 of the resilient annular flange 114 and also includes a third face 194, which is co-extensive in part with the second face 166. The second face 166 and third face 194 define a thickness therebetween, which is clamped between the axially-inwardly facing shoulder 168 of the suction plate 154 and an adjacent pump element, or portion 186 of the main liner 182. The terminal edge 134 of the resilient annular flange 114 is oriented toward the main liner 182. The main liner 182 may be formed with an annular channel 190 into which the locating rim 136 of the resilient annular flange 114 is received.

FIGS. 6, 7 and 8A may be referred to as illustrative of the assembly of the throatbush 146 relative to the pump 176. FIGS. 6 and 7 illustrate a first step where the suction plate 154 is positioned to receive the tubular portion 148 of the throatbush 146 into the inlet opening 156 of the suction plate 154, and an outer surface 214 of the throatbush 146 is brought into close proximity to the suction plate 154. The first face 164 and second face 166 of the resilient annular flange 114 are, thereby, brought into contact with the axially-inwardly facing shoulder 168 of the suction plate 154. The throatbush 146 is maintained at a position relative to the suction plate 154 so that the collar portion 130 is positioned adjacent to or in contact with the axially-inwardly facing shoulder 168 so that the collar portion 130, and particularly the locating rim 136, are optimally positioned to register with the main liner 182 of the pump 176, and so that the locating rim 136 is properly received in the annular channel 190 of the main liner 182.

The arrangement of the throatbush 146 and suction plate 154 are then brought into registration with the main liner 182 and outer casing 178, and the suction plate 154 is bolted to the pump casing 178. The collar portion 130 becomes clamped between the portion 186 of the main liner 182 and the axially-inwardly facing shoulder 168, but the skirt portion 126 of the resilient annular flange 114 is not rigidly clamped between any of the pump elements, as noted further hereafter.

The resilient annular flange 114 is configured with a fourth face 196 that is generally co-extensive with the first face 164 and, at initial assembly, the fourth face 196 is positioned in slidable contact with the first surface 108 of the annular band 102.

In some embodiments of the disclosure, the seal 100 may be configured with an annular lip 140 that projects radially inwardly from the second surface 110 of the annular band 102 and is positioned to engage an annular groove 202 formed near the outer circumferential area 144 of the radially-extending ring portion 158 of the throatbush 146. The annular lip 140 is located at the second circumferential end 106 of the annular band 102 and extends generally radially away from the pivotable region 116 of the seal 100 and toward the centerline 122. The annular lip 140, when present, is either formed to the annular groove 202 during a molding process, or is bonded to the annular groove 202 after molding of the seal 100.

Figure 8B:
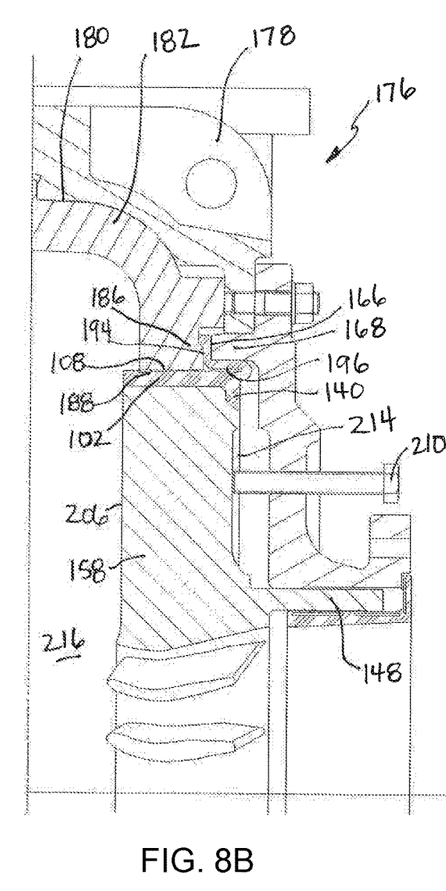
FIGS. 8B-8E depict the throatbush and seal of FIG. 8A through progressive axial adjustments of the throatbush in a direction away from the suction plate.

FIGS. 8B through 8E illustrate the mode by which the seal 100 of the present disclosure operates, in use, to provide an improved sealing arrangement in centrifugal pumps having pump elements that are adjustable relative to each other. Specifically, as shown in FIG. 8B, when it becomes necessary to axially adjust the throatbush 146 relative to the suction plate 154 to bring the inner surface 206 of the throatbush 146 into closer tolerance with the impeller (not shown), adjustable screws 210, which extend through openings 212 in the suction plate 154, and which are positioned to contact an outer surface 214 of the throatbush 146, are rotated to effect axial movement of the throatbush 146 toward the pump chamber 216 in which the impeller is positioned.

As the throatbush 146 is axially adjusted, the fourth face 196 of the resilient annular flange 114 slides along the first surface 108 of the annular band 102 of the seal 100 facilitated by the flexibility of the pivotable region 116 of the seal 100. The sealing between the first surface 108 of the seal 100 and the axially extending surface 188 of the pump element or main liner 182 is maintained due to the close fit between the throatbush 146 and the main liner 182, and may be facilitated further by surface protrusions 142 formed in the first surface 108 of the annular band 102.

Figure 8C:
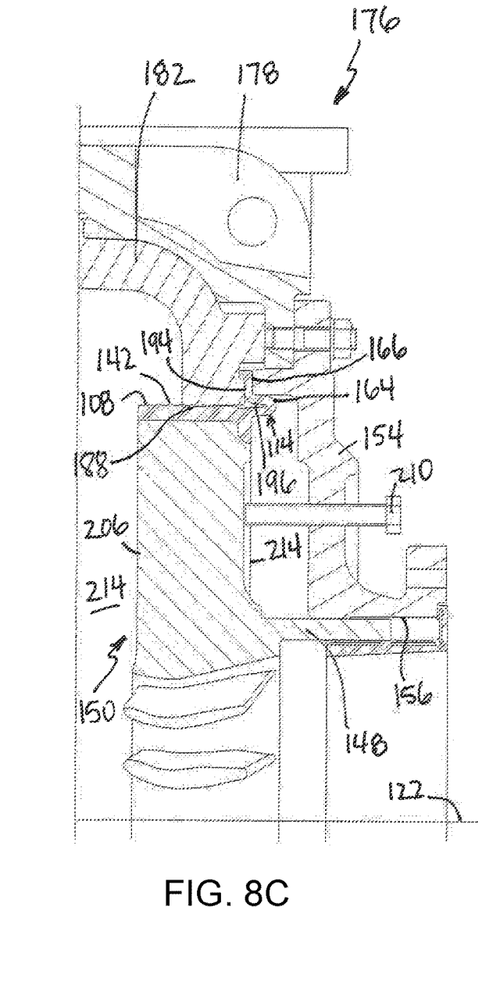
Figure 8D:
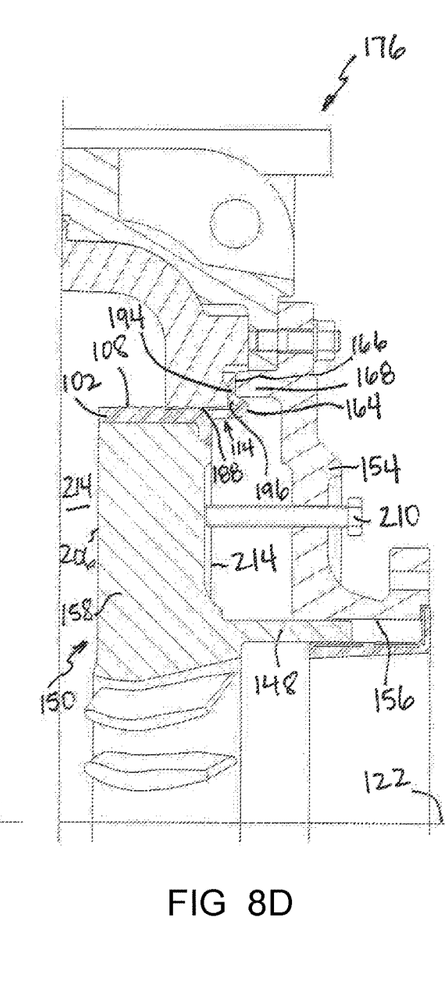
Figure 8E:
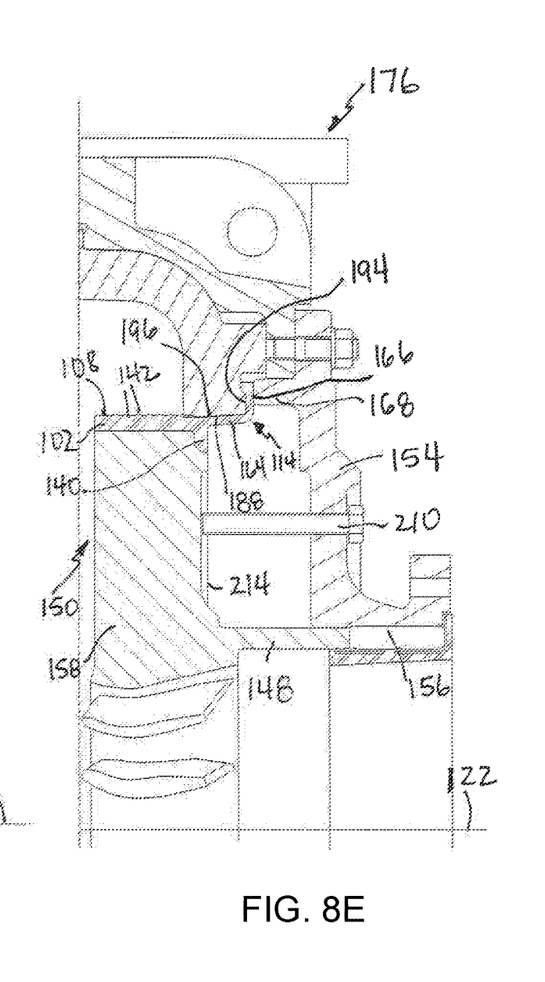

FIGS. 8C through 8E illustrate the progressive change in arrangement of the resilient annular flange 114 of the seal 100 as the throatbush 146 is axially adjusted farther away from the suction plate 154. It can be seen that the configuration of the resilient annular flange 114, in tandem with the flexibility of the pivotable region 116 and the flexible elbow region 132, enables the throatbush 146 to be adjusted farther in an axial direction, while maintaining the seal between the main liner 182 and the throatbush device 150, than is achievable in conventional sealing arrangements.

A comparison of pumps of equivalent size, one being structured with the conventional throatbush shown in FIGS. 3-5, and one being structured with the throatbush and seal 100 of the present disclosure as shown in FIGS. 6-8C, demonstrates the advantages of the seal 100 and throatbush device 150 of the present disclosure over conventional seal arrangements. Specifically, in the conventional seal arrangement of FIG. 1, the length of the resilient arm 58, as measured from the bend 60 to the point of outward extension of the axially extending ridge 66 is approximately 70 mm. In use, the resilient arm 58 is able to stretch a distance (i.e., as shown between FIG. 3 and FIG. 5) that is approximately 83 mm. Thus, the resilient arm 58 of the conventional seal can provide about a 119% amount of stretch or travel distance in the throatbush.

By comparison in a pump of equivalent size, the resilient annular flange 114 of the present disclosure has a length, as measured between the pivotable region 116 and the point of outward extension of the locating rim 136, of approximately 132 mm. In use, as the throatbush 146 is axially adjusted (i.e., as depicted in FIGS. 8A-8C), the resilient annular flange 114 provides approximately 200 mm of travel distance in the throatbush 146. Thus, the resilient annular flange 114 provides about a 150% amount of stretch or travel distance to the throatbush 146.

The structure of the seal 100 provides additional advantages over the conventional seal arrangement in providing an annular lip 140 the configuration of which also aids in stabilizing the seal 100 and improving the stretching capabilities of the resilient annular flange 114. Further, the configuration of the resilient annular flange 114, which bends to travel along the first surface 108 of the annular band 102, provides a seal diameter that is smaller than conventional seal arrangements, thereby enabling the bolts 174 that connect the suction plate 154 to the outer casing 178 to be positioned closer to the outer circumference of the throatbush 146, which produces a stronger bolting joinder that better withstands pressure forces imposed against the throatbush 146 by the fluid being processed in the pump chamber.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, inventions have been described in connection with what are presently considered to be the most practical and preferred embodiments. It is to be understood that the inventions are not to be limited to the disclosed embodiments, but on the contrary, are intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A seal for use with pump casing elements that are adjustable relative to each other, comprising:
    an annular band having a first circumferential end and a second circumferential end, and having a first surface extending at least partially between said first circumferential end and said second circumferential end, and having a second surface extending at least partially between said first circumferential end and said second circumferential end, said second surface being spaced from said first surface and oriented in a direction opposite to said first surface; and
    a resilient annular flange positioned proximate said second circumferential end of said annular band and extending at a non-perpendicular angle with respect to said first surface of said annular band, said resilient annular flange having a surface oriented toward the first surface of said annular band and being arranged so that, in use, a slidable portion of the surface of said annular flange is in slidable direct contact with said first surface of said annular band, said slidable portion being adapted to be slidable along said first surface toward or beyond said second circumferential end as the pump casing elements are adjusted relative to each other.

2. The seal according to claim 1, further comprising a pivotable region located between said resilient annular flange and said annular band to facilitate movement of said resilient annular flange toward and away from said first surface of said annular band, said pivotable region being located beyond a plane, defined by said first surface of said annular band, in a direction away from said second surface.

3. The seal according to claim 2, wherein said resilient annular flange is further comprised of a terminal edge positioned at a distance from said pivotable region.

4. The seal according to claim 3, further comprising a locating rim extending along and outwardly from said terminal edge of said resilient annular flange.

5. The seal according to claim 3, wherein said resilient annular flange further comprises a skirt portion that is connected at one end to said annular band, and a collar portion that is connected to said skirt portion and which extends away from said skirt portion in a direction away from said annular band.

6. The seal according to claim 5, wherein said collar portion comprises a further terminal edge and a locating rim extending along said further terminal edge of said collar portion.

7. The seal according to claim 1, wherein said annular band is made of resilient material.

8. The seal according to claim 1, wherein said annular band and resilient annular flange are unitarily formed.

9. The seal according to claim 1, wherein said first surface of said annular band comprises surface protrusions.

10. The seal according to claim 1, further comprising an inwardly extending annular lip projecting outwardly in a direction away from said second surface.

11. The seal according to claim 10, wherein said annular lip is located proximate said second circumferential end of said annular band.

12. A throatbush device for use in a centrifugal pump having a pump element portion and a side liner portion that defines a suction plate of a the centrifugal pump, comprising:
    a throatbush having an axially-extending tubular portion and a radially-extending ring portion, the radially-extending ring portion having an outer circumferential area with an annular surface;
    a seal located along the annular surface of the outer circumferential area of said throatbush, the seal comprising,
        an annular band having a first circumferential end and a second circumferential end,
        a first surface extending at least partially between said first circumferential end and said second circumferential end,
        a second surface extending at least partially between said first circumferential end and said second circumferential end, the second surface being positioned along said annular surface of the outer circumferential area of the throatbush, and
        a resilient annular flange positioned proximate said second circumferential end of said annular band, said resilient annular flange having a pivotable region that extends from said first surface of said annular band radially beyond a plane defined by said first surface of said annular band in a direction radially away from said second surface of said annular band, said resilient annular flange having a surface oriented toward the first surface of said annular band and being arranged so that, in use, a slidable portion of the surface of said annular flange is in slidable direct contact with said first surface of said annular band, said slidable portion being adapted to be slidable along said first surface toward or beyond said second circumferential end as the pump casing elements are adjusted relative to each other.

13. The throatbush device according to claim 12, wherein said resilient annular flange is structured to provide a first face and a second face, the second face being positioned at an angle to said first face, both said first face and said second face being oriented for contact with a suction plate portion of the centrifugal pump.

14. The throatbush device according to claim 13, wherein said resilient annular flange is further structured with a third face, co-extensive in part with said second face of said resilient annular flange, and being oriented for location against the pump element portion of the centrifugal pump, the second face and third face defining a thickness therebetween that is structured for securement between the pump element portion and a suction plate portion of the centrifugal pump.

15. The throatbush device according to claim 14, wherein said resilient annular flange is further structured with a fourth face, defining the slidable portion, that is co-extensive with said first face, the fourth face, in use, being positioned to move along said first surface of said annular band.

16. The throatbush device according to claim 12, wherein said resilient annular flange further comprises a locating rim that extends outwardly from said third face to engage with the pump element portion of the centrifugal pump.

17. The throatbush device according to claim 16, wherein said locating rim is positioned proximate a terminal edge of said resilient annular flange.

18. The throatbush device according to claim 12, wherein said first surface of said annular band is configured with surface protrusions.

19. The throatbush device according to claim 12, wherein said seal further comprises an annular lip that projects from said second surface and is positioned to engage an annular groove formed in the ring portion of the throatbush near the outer circumferential area of the throatbush.

20. A centrifugal pump, comprising:
an outer pump casing defining a volute;
a main liner positioned along an inner surface of the volute of the outer pump casing;
a suction plate connected to said outer casing and positioned adjacent a portion of the main liner, the suction plate having a central opening defining a suction inlet opening;
an axially-movable throatbush having an axially-extending tubular portion, that extends through the suction inlet opening of the suction plate, and a radially-extending ring portion that is positioned adjacent the suction plate, the radially-extending ring portion having an outer circumferential area with an annular surface;
a seal located along the annular surface of the outer circumferential area of said throatbush, the seal comprising,
an annular band having a first circumferential end and a second circumferential end,
a first surface extending at least partially between said first circumferential end and said second circumferential end,
a second surface extending at least partially between said first circumferential end and said second circumferential end, the second surface being positioned along said annular surface of the throatbush, and
a resilient annular flange positioned proximate said second circumferential end of said annular band, said resilient annular flange having a pivotable region that extends from said first surface of said annular band radially beyond a plane that is defined by said first surface of said annular band, in a direction radially away from said second surface of said annular band;
wherein the resilient annular flange of the seal is positioned, along two extending faces of the resilient annular flange, against the suction plate, and wherein the resilient annular flange is clamped between the suction plate and the main liner so that the resilient annular flange, at initial assembly of the centrifugal pump, is positioned against and in direct contact with said first surface of said annular band of said seal.

21. The centrifugal pump according to claim 20, further comprising an annular lip that projects from said second surface of said annular band and is positioned to engage an annular groove formed in the ring portion of the throatbush near the outer circumferential area of the throatbush.

22. The centrifugal pump according to claim 20, where said resilient annular flange further comprises a locating rim that is positioned to engage with the main liner of the centrifugal pump.

23. A method of sealing an adjustable throatbush of a centrifugal pump relative to other pump elements of the centrifugal pump, comprising:
providing a centrifugal pump having an outer casing, a main liner positioned along a volute of the outer casing and a suction plate having a central inlet opening;
providing an axially-movable throatbush having an axially-extending tubular portion, that extends through the suction inlet opening of the suction plate of the pump, and a radially-extending ring portion that is positioned adjacent the suction plate, the radially-extending ring portion having an outer circumferential area with an annular surface;
providing a seal located along the annular surface of the outer circumferential area of the axially-movable throatbush, the seal comprising,
an annular band having a first circumferential end and a second circumferential end,
a first surface extending at least partially between said first circumferential end and said second circumferential end,
a second surface extending at least partially between said first circumferential end and said second circumferential end, the second surface being positioned along said annular surface of the axially-movable throatbush, and
a resilient annular flange positioned proximate said second circumferential end of said annular band, said resilient annular flange having a pivotable region that extends from said first surface of said annular band radially beyond a plane that is defined by said first surface of said annular band, in a direction radially away from said second surface of said annular band;
positioning the resilient annular flange of the seal to contact the suction plate of the pump along two extending faces of the resilient annular flange; and
clamping a portion of the resilient annular flange between the suction plate and the main liner of the pump such that, at initial assembly of the centrifugal pump, a portion of the resilient annular flange is positioned against and in direct contact with the first surface of the annular band of the seal and is configured to move along the first surface of the annular band in slidable direct contact therewith as the axially-movable throat-bush is axially adjusted.

* * * * *